United States Patent [19]

Hoefer et al.

[11] Patent Number: 5,312,865

[45] Date of Patent: May 17, 1994

[54] COATING COMPOSITIONS

[75] Inventors: Rainer Hoefer, Duessledorf; Roland Gruetzmacher, Wuelfrath; Gerhard Kaindl, Hilden, all of Fed. Rep. of Germany

[73] Assignee: Henkel Kommanditgesellschaft auf Aktien, Duesseldorf, Fed. Rep. of Germany

[21] Appl. No.: 955,910

[22] PCT Filed: Jun. 6, 1991

[86] PCT No.: PCT/EP91/01052

§ 371 Date: Dec. 15, 1992

§ 102(e) Date: Dec. 15, 1992

[87] PCT Pub. No.: WO91/19750

PCT Pub. Date: Dec. 26, 1991

[30] Foreign Application Priority Data

Jun. 15, 1990 [DE] Fed. Rep. of Germany ....... 4019171

[51] Int. Cl.$^5$ ............................................. C08L 75/04
[52] U.S. Cl. ................................. 524/591; 524/839; 524/840; 528/71; 528/80; 528/81
[58] Field of Search ..................... 524/591, 839, 840; 528/71, 80, 81

[56]         References Cited

U.S. PATENT DOCUMENTS

| 4,098,743 | 7/1978 | Scriven et al. | 528/80 |
| 4,124,552 | 11/1978 | Koleske et al. | 528/83 |
| 4,171,391 | 10/1979 | Parker | 528/65 |
| 4,203,883 | 5/1980 | Hangauer, Jr. | 528/72 |

FOREIGN PATENT DOCUMENTS

| 717432 | 12/1968 | Belgium . |
| 0148970 | 7/1985 | European Pat. Off. . |
| 0220000 | 10/1986 | European Pat. Off. . |
| 0278278 | 8/1988 | European Pat. Off. . |
| 1595602 | 9/1969 | Fed. Rep. of Germany . |
| 2624442 | 12/1976 | Fed. Rep. of Germany . |
| 3603996 | 8/1987 | Fed. Rep. of Germany . |
| 3625605 | 2/1988 | Fed. Rep. of Germany . |

Primary Examiner—Maurice J. Welsh
Attorney, Agent, or Firm—Ernest G. Szoke; Wayne C. Jaeschke; Daniel S. Ortiz

[57] ABSTRACT

The invention is a coating composition containing an aqueous polyurethane dispersion wherein the polyurethane is prepared from a mixture of polycaprolactone diols and an isocyanate mixture having an NCO functionality of more than 1.5 wherein the ratio NCO:OH is from 0.9:1 to 2.5:1. The polyurethane also can contains functional components capable of salt formation in the aqueous solution. The coating composition is particularly useful for coating flexible substrates such as leather and flexible polymeric materials.

18 Claims, No Drawings

COATING COMPOSITIONS

FIELD OF THE INVENTION

This invention relates to coating compositions containing aqueous polyurethane dispersions, the polyurethanes on which the polyurethane dispersions are based being synthesized from a polyol mixture which consists at least predominantly of polycaprolactone diols, and to the use of the coating compositions for the production of coatings on flexible substrates, preferably on leather, leather substitutes and/or flexible plastics.

BACKGROUND OF THE INVENTION

Coating compositions based on aqueous polyurethane dispersions have been known for some time. In general, the polyurethanes on which the polyurethane dispersions are based are produced by polyaddition of polyols with diisocyanates, the co-condensation of components capable of salt formation having an advantageous effect on dispersibility. Polyurethane urea dispersions, which are also used as coating compositions, are formed in the presence of chain-extending agents, such as diamines.

RELATED ART

European patent 148 970 describes stable aqueous dispersions of polyurethane ureas which may be used inter alia as coating compositions and impregnating agents for all types of substrates, as binders in paints, as adhesives and as auxiliaries in the paper industry. The polyurethane ureas on which the dispersions are based contain as internal emulsifier chemically incorporated anionic groups and a mixture of volatile and non-volatile cations as counterions. The resistance of the films to swelling under the effect of water is increased through the contents of volatile cations while the stability of the films to hydrolysis is increased through the content of non-volatile cations.

Polyurethane urea dispersions containing a co-condensed internal emulsifier are also known from DE-OS 26 24 442. The aqueous polyurethane urea dispersions described therein are used in DE-OS 36 25 605 for the production of aqueous pigment preparations for water-based and, optionally, alcoholic gravure, flexographic and screen printing inks. The pigment preparations obtained are relatively stable to alcohols and to storage and show improved adhesion properties and drying rates.

DE-OS 37 02 615 describes coating compositions and finishes for leather based on aqueous polyurethane dispersions. The polyurethanes on which the polyurethane dispersions are based are obtained using a polyol mixture consisting of polyester polyols and, optionally, polyether polyols and the compulsorily present oleochemical polyols containing at least three functional hydroxyl groups. The leathers or leather substitutes coated and finished with these polyurethane dispersions are entirely satisfactory in such properties as durability, brittleness, wet and dry rubbing resistance, compactness and gloss. In addition, they have high fastness values without the toxicologically unsafe aziridines having to be used for crosslinking, so that they are particularly suitable as top coats.

Although the above-described coating compositions based on aqueous polyurethane dispersions are improved in their properties, it has been preferred until very recently, for example in the leather industry for finishing leather, to apply polyurethanes to leather and leather substitutes from organic solution. In the field of printing inks, too, the consumption of solvent-containing inks is still considerably higher in relation to the consumption of water-based inks in which water is the sole liquid component or the principal liquid component besides alcohols.

Accordingly, there is still a need to improve coating compositions based on aqueous polyurethane dispersions in their properties, above all in their adhesion, hardness, resistance to water and alcohols, drying behavior and their wetting of the substrate, so that they may be used to the same extent as solvent-containing polyurethane systems.

Accordingly, the problem addressed by the present invention was to provide coating compositions based on aqueous polyurethane dispersions which are improved in their resistance to alcohols, their adhesion and the other properties mentioned above.

BRIEF DESCRIPTION OF THE INVENTION

The present invention relates to coating compositions for flexible substrates containing aqueous polyurethane dispersions, characterized in that the polyurethanes on which the polyurethane dispersions are based are synthesized from a polyol mixture consisting at least predominantly of polycaprolactone diols, an isocyanate mixture having an NCO functionality of more than 1.5 in an NCO:OH ratio of 0.9:1 to 2.5:1, a functional component capable of salt formation in aqueous solution and, if desired, a chain-extending agent.

DETAILED DESCRIPTION OF THE INVENTION

The polyurethane forming the basis of the polyurethane dispersions used in accordance with the invention are based on a polyol mixture consisting completely or partly of polycaprolactone diols. In their broad disclosures, DE-OS 26 24 442 and EP-PS 148 970 also name polycaprolactones among the group of polyester polyols. However, there is no reference to the fact that specifically polycaprolactone diols form a suitable basis for polyurethane dispersions for coating compositions. In addition, polycaprolactones are understood in DE-OS 26 24 442 to encompass the various products obtained when a cyclic lactone, for example ε-caprolactone, is reacted with a polyol, an acid-containing polyol or a hydroxy acid. However, reactions with hydroxy acids lead to ring-opened products which have only one free hydroxyl group. These products are unsuitable for the purpose according to the invention. In addition, polycaprolactones of only one type and not mixtures of polycaprolactones are always mentioned as the polyol component.

The polycaprolactone diols used in accordance with the invention are understood to be polyester polyols which may be prepared by ring-opening polymerization of ε-caprolactone and which contain a hydroxyl group at either end. Products such as these may be industrially produced, for example, by the so-called Interox process in the presence of Lewis acids or organic acids or alkyl tin compounds or alkyl titanium compounds as catalysts at temperatures of 20° C. to around 150° C. The polycaprolactone diols produced by this process are preferred for the purposes of the invention by virtue of their very narrow molecular weight distribution.

The polycaprolactone diols according to the invention are produced by ring-opening polymerization of ε-caprolactone with aliphatic and/or aromatic diols. Among the aliphatic diols, saturated, unsaturated, linear and branched diols, such as ethylene glycol, 1,3-butanediol, 1,4-butanediol, butenediol, neopentyl glycol, are equally suitable. The molecular weight and hydroxyl value of the polycaprolactone diols play a particularly important role in the solution to the problem addressed by the invention. In the ring-opening polymerization, the degree of oligomerization and, hence, the molecular weight and hydroxyl value of the polycaprolactone diols can be controlled in known manner through the quantitative ratios of the diols to the ε-caprolactones. Suitable polycaprolactone diols have a molecular weight of 230 to 10,000 and preferably 1,000 to 5,000 and a hydroxyl value of 15 to 540 and preferably 25 to 140. Mixtures of various polycaprolactone diols differing in their molecular weight within the stated limits are particularly preferred. Of these, mixtures of two different polycaprolactone diols, in which one diol A has a molecular weight of 500 to 2,500 and preferably 1,500 to 2,250 and a hydroxyl value of 40 to 225 and preferably 45 to 75 while the other diol B has a molecular weight of 2,500 to 6,000 and preferably 2,750 to 4,000 and a hydroxyl value of 15 to 55 and preferably 25 to 45, have proved to be particularly effective. Mixtures of diol A with diol B in a ratio by weight of A to B of 1:10 to 10:1, preferably 2:7 to 7:2 and, more preferably, 3:1 to 1:3 are particularly suitable. Coating compositions having excellent properties, above all in regard to the hardness of the coatings, are obtained where the above-described polycaprolactone diol mixtures are used.

The polyurethanes forming the basis of the polyurethane dispersions used in accordance with the invention are based on a polyol mixture, of which 60% by weight, preferably 85% by weight and, more particularly, 100% by weight, based on polyol mixture, consists of polycaprolactone diols. In addition, the polyol mixture may contain, based on polyol mixture, up to 404 by weight and preferably up to 154 by weight of other typical polyols, such as polyether polyols, polytetrahydrofuran and/or polyester polyols containing on average 2 to at most 4 hydroxyl groups. Quite generally, the other polyols used are substantially linear and have a molecular weight in the range from 300 to 20,000 and preferably in the range 500 to 6,000. Examples of polyether polyols are the polymerization products of ethylene oxide, propylene oxide, butylene oxide and copolymerization or graft polymerization products thereof and the polyether polyols obtained by condensation of polyhydric alcohols or mixtures thereof and the polyether polyols obtained by alkoxylation of polyhydric alcohols, amines, polyamines and aminoalcohols. Taking the above-mentioned conditions for the polyols into account, polyesters,, polyester amides and polyamides of polybasic, saturated and unsaturated carboxylic acids or their anhydrides and polyhydric, saturated and unsaturated alcohols, aminoalcohols, diamines, polyamines and mixtures thereof and also polyterephthalates or polycarbonates may also be used as a further polyol component. Relatively high molecular weight polymers or condensates, such as for example polyethers, polyacetals, polyoxymethylenes, may also be used as polyol component in the synthesis of the polyurethanes. According to the invention, the polyurethanes on which the polyurethane dispersions are based are preferably synthesized from polyol mixtures which consist solely of polycaprolactone diols and which, more particularly, consist of the already described polycaprolactone diol mixtures containing polycaprolactone diols A and B having the stated molecular weights and hydroxyl values in the stated ratios by weight of A to B.

The polyurethanes forming the basis of the polyurethane dispersions used in accordance with the invention are based on an isocyanate mixture having an average NCO functionality of more than 1.5 and preferably having an average NCO functionality of 2 to 3. Suitable isocyanates are any monofunctional isocyanates, diisocyanates and polyfunctional isocyanates either individually or in admixture providing the average NCO functionality meets the requirement stated above. Preferred isocyanates are aromatic and aliphatic diisocyanates, such as 1,5-naphthylene diisocyanate, 4,4'-diphenyl methane diisocyanate, 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate, optionally in admixture, 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxybutane-1,4-diisocyanate, butane-1, 4-diisocyanate, hexane-1,6-diisocyanate, dicyclohexyl methane diisocyanate, cyclohexane-1,4-diisocyanate, ethylene diisocyanate, phthalic acid-bis-isocyanatoethyl ester; polyisocyanates containing reactive halogen atoms, such as 1-chloromethylphenyl-2,4-diisocyanate, 1-bromomethylphenyl-2,6-diisocyanate, 3,3 -bis-chloromethyl ether-4,4'-diphenyl diisocyanate. Sulfur-containing polyisocyanates are obtained, for example, by reaction of 2 mol hexamethylene diisocyanate with 1 mol thiodiglycol or dihydroxydihexyl sulfide. Other important diisocyanates are trimethyl hexamethylene diisocyanate, 1,4-diisocyanatobutane, 1,2-diisocyanatododecane, tetramethyl xylene diisocyanate and dimer fatty acid diisocyanate. Aliphatic diisocyanates are preferred. Of these, cyclic or branched aliphatic diisocyanates, such as isophorone diisocyanate, the already mentioned 1,6-hexane diisocyanate and dicyclohexyl methane diisocyanate, are particularly useful.

Another important constituent of the polyurethanes on which the polyurethane dispersions used in accordance with the invention are based is a functional group which is capable of salt formation in aqueous solution and which may be regarded as a kind of internal emulsifier. Dihydroxy compounds of carboxylic acids and/or sulfonic acids are used as the functional group capable of salt formation in aqueous solution. These compounds may either be used as such or may be prepared in situ. In order to introduce ionizable compounds containing carboxylic acid groups into the polyurethane, dihydroxycarboxylic acids may be added to the polyols. Preferred dihydroxycarboxylic acids are 2,2-dihydroxycarboxylic acids, among which dimethylol propionic acid is particularly preferred.

The polymers are present in salt form in the polyurethane dispersions used in accordance with the invention. The preferred polymers modified with carboxylic acids contain alkali metal salts, ammonia or amines, i.e. primary, secondary or tertiary amines, as counterions. The groups capable of salt formation may be partly or completely neutralized by the counterions. An excess of neutralizing may also be used.

If desired, special chain-extending agents containing at least one basic nitrogen atom, such as for example mono-, bis- or polyalkoxylated aliphatic, cycloaliphatic, aromatic or heterocyclic primary amines,, may be used. However, it is preferred to use only small quantities and particularly preferred to use no special chain-extending agent at all.

To produce the polyurethanes particularly suitable for the purposes of the invention, polyol mixtures are polymerized with the isocyanate mixture in an NCO-:OH ratio of 0.9:1 to 2.5:1 and preferably in an almost equimolar ratio or in a slight excess of isocyanate. To produce water-clear polyurethane dispersions, it is best to use the component capable of salt formation, expressed as dimethylol propionic acid, in quantities of 1 to 30% by weight, preferably in quantities of 2 to 20% by weight and, more preferably, in quantities of 10 to 18% by weight, based on polyol. In addition, transparency depends upon the degree of neutralization. It is readily possible by conducting a few preliminary tests to determine the quantity of neutralizing agent beyond which a sufficient degree of transparency is achieved. In general, as little of these substances as possible should be used because otherwise the resistance of the coating film to water might suffer.

Basically, the aqueous polyurethane dispersions may be produced by known processes, for example by the acetone process (D. Dieterich, Angewandte Molekulare Chemie, 98, 133 (1981)) and by the process according to DE 15 95 602. New processes for the production of polyurethane dispersions are mentioned in DE 36 03 996 in the acknowledgement of the prior art. The polyurethane dispersions are preferably produced by the so-called one-pot process or two-pot process. In the one-pot process, the polyol mixture is predissolved with heating in an inert solvent together with the components capable of salt formation. The isocyanate mixture is then added in the presence of more inert solvent and is polymerized over a period of 1 to 6 hours at a temperature of approximately 50° C. to approximately 120° C. Finally, a strong base capable of ionizing the salt-forming groups is added. Lastly, water is added under typical reaction conditions. Vigorous stirring increases the dispersibility of the polyurethanes in water. In the two-pot process, the polyol mixture is reacted with the isocyanate mixture in the usual way. To this end, the polyurethane prepolymer prepared as described above is stirred into a second water-filled pot and the neutralizing agent and optionally the chain-extending agent are subsequently added.

The polyurethane dispersions used in accordance with the invention have a solids content of more than 25% by weight, preferably in the range from 30 to 60% by weight and, more preferably, in the range from 35 to 55% by weight, based on aqueous polyurethane dispersion. They are characterized by a viscosity in the range from 0.01 to 150 Pas and preferably in the range from 0.1 to 10 Pas and by an average particle size of the polyurethanes in the range from 40 to 400 nm, preferably in the range from 100 to 300 nm and, more preferably, in the range from 125 to 250 nm.

The coating compositions according to the invention contain the aqueous polyurethane dispersions described above in quantities of 5 to 80% by weight, preferably in quantities of 20 to 75% by weight and, more preferably, in quantities of 50 to 70% by weight, based on coating composition. The coating compositions contain as further constituents water, preferably deionized water, in quantities of 2 to 80% by weight and preferably in quantities of 10 to 70% by weight and a water-miscible organic solvent in quantities of 0 to 50% by weight and preferably in quantities of 0 to 30% by weight. Suitable water-miscible organic solvents are, primarily, monohydric aliphatic alcohols containing 1 to 4 carbon atoms, such as methanol, ethanol, n- and isopropanol and also n- and isobutanols or mixtures thereof. In addition, the coating compositions according to the invention may contain other typical additives, such as pigments, wetting agents and preservatives, sedimenting agents and the like in quantities of 0 to 80% by weight, depending on the purpose for which they are to be used. If the coating compositions according to the invention are used for coating and finishing leather and leather substitutes, it is advisable with regard to the aqueous polyurethane dispersions to mix the usual additives, such as homopolymers or copolymers of acrylic acid and of acrylates with styrene, acrylamide, acrylonitrile, vinyl acetate and vinyl esters in general and/or vinyl ethers (simplified: polyacrylates), colloidal casein, modified silicones, with aqueous emulsions of natural or synthetic waxes or wax esters, foam inhibitors and pigment preparations.

The advantage of the coating compositions and finishes for leather corresponding to the coating compositions according to the invention is that particularly high fastness values are obtained without any need to use toxicologically unsafe aziridines or technically complicated irradiation equipment for crosslinking. Accordingly, they are eminently suitable as base coats, but especially as top coats. In addition, leathers coated with them show improved fastness to wet rubbing.

If organic pigments, such as azo pigments, azamethines, azaporphines, quinacridones, flavanthrone, anthanthrone and pyranthrone pigments or inorganic pigments, such as white and colored pigments, or mixed oxide pigments or blended pigments and carbon black are used in the coating compositions according to the invention, it is possible to produce excellent water-based and/or aqueous/alcoholic gravure, flexographic or screen printing inks for flexible substrates, such as elastic plastics. Printing inks such as these contain the described pigments in quantities of 0.5 to 804 by weight, preferably in quantities of 1 to 70% by weight and, more preferably, in quantities of 2 to 60% by weight, based on printing ink. In this embodiment also,, it is often useful to use individual additives from those mentioned above in connection with the coating of leather, such as polyacrylates and/or wax emulsions.

On the whole, the coating compositions according to the invention are distinguished by high pigment dispersing power and by good pigment compatibility. Application of the coating compositions according to the invention by known methods gives films having improved film formation (drying), high film hardness, improved film flexibility, adhesion, alcohol resistance, abrasion resistance and flexural elasticity.

The coating compositions according to the invention are produced in known manner and—where pigments are present—in dependence upon the particle hardness of the pigments used, for example using stirrers, dissolvers, rotor/stator mills, ball mills, stirred ball mills and in high-speed mixers.

The present invention also relates to the use of the coating compositions for the production of coatings on flexible substrates, preferably on leather and leather substitutes and/or on flexible plastics, such as flexible PVC, polyolefins and the like. As mentioned above, other additives may be present in addition to the aqueous polyurethane dispersions, the water and optionally the solvents, depending on the purpose for which the coating compositions are to be used. The coatings obtained with the coating compositions according to the invention have improved adhesion properties, improved pigment absorption and higher resistance to alcohols, which are particularly emphasized among the properties already described.

EXAMPLES

General procedure 1

In a polymerization reactor equipped with a stirrer, heating and cooling jacket and a reflux condenser,, the polyols were melted under nitrogen. The component capable of ion formation, dimethylol propionic acid, and three quarters of the quantity of inert solvent added,, for example N-methyl-2-pyrrolidone, were then successively added with stirring. The isocyanate mixture was then added at temperatures of 50° to 70° C., after which the reaction mixture was heated to temperatures of 80° to 90° C. A free NCO content below 5.5% by weight was established. It is important in this regard to bear in mind the fact that, in the chosen method of titration (dibutyl amine solution), this value also includes the consumption of dibutyl amine solution for neutralization of the dimethylol propionic acid. After 4 to 5 hours, the polymerization mixture was cooled to 60° C. and neutralized, for example with N-methyl morpholine. Finally, water was added after about 30 minutes.

Example 1

Using general procedure 1,, an aqueous polyurethane dispersion was prepared from:

|  | Parts by weight |
|---|---|
| Polycaprolactone diol, molecular weight approx. 2,000, OH value approx. 55 (Capa 222 ®) | 13.54 |
| Polycaprolactone diol, molecular molecular weight approx. 3,000, OH value approx. 40 (Capa 231 ®) | 4.51 |
| Dimethylol propionic acid | 3.2 |
| N-Methyl-2-pyrrolidone | 8.97 |
| Isophorone diisocyanate | 13.49 |
| N-Methyl morpholine | 2.41 |
| Water, deionized | 52.91 |

General procedure 2

The neutralized prepolymer obtained by general procedure 1 was introduced as quickly as possible with stirring into the quantity of water mentioned in Example 1. The dispersions were first stirred for about 1.5 hours at average speed and were then stirred for another 3 hours at reduced speed at temperatures of around 60° to 70° C. The dispersion was then cooled to around 40° C., followed by the addition of 10% ammonia (approx. 0.67 part by weight, based on Example 1).

APPLICATION EXAMPLES

Example 2

Finishing of furniture leather (crust)

Priming

100 Parts by weight of an aqueous pigment preparation were mixed with 150 parts by weight of the polyurethane dispersion of Example 1. 60 Parts by weight of a wax dispersion, 20 parts by weight of an aqueous flatting aid and 350 parts by weight water were then added. The liquor is sprayed 3 to 4 times. Testing of fastness to rubbing in accordance with DIN 53 339 shows no damage after rubbing 1,000x on a dry felt and no damage after rubbing 300x on a wet felt. Tests to determine long-term flexural behavior in a Bally flexometer (DIN 53 351) show no damage after flexing 100,000x (dry) and no damage after flexing 20,000x (wet).

APPLICATION EXAMPLE 2

Production of a printing ink

60 Parts of the polyurethane dispersion of Example 1 having a solids content of approx. 35%, based on polyurethane dispersion, were mixed with 20 parts by weight water, 15 parts by weight isopropanol and 3 parts by weight pigment preparations produced in the usual way. The printing ink is suitable for screen printing, intaglio printing and flexographic printing and shows rapid drying and excellent adhesion.

APPLICATION EXAMPLES 3 TO 12

Application Examples 3 to 6: invention

Application Examples 7-12: comparison

The dispersion was prepared by general procedure 2 and printing inks were subsequently prepared therefrom as described in Application Example 2.

|  | Example | | | | | | | | | |
|---|---|---|---|---|---|---|---|---|---|---|
|  | 3 | 4 | 5 | 6 | 7 | 8 | 9 | 10 | 11 | 12 |
| Polyol 1 | 13.54 | 13.0 | 18.99 | — | — | — | — | — | — | — |
| Polyol 2 | 4.51 | 4.44 | — | 26.19 | — | — | — | — | — | — |
| Polyol 3 | — | — | — | — | 18.73 | — | — | — | — | — |
| Polyol 4 | — | — | — | — | — | 17.75 | — | — | — | — |
| Polyol 5 | — | — | — | — | — | — | 16.2 | — | — | — |
| Polyol 6 | — | — | — | — | — | — | — | 22.47 | — | — |
| Polyol 7 | — | — | — | — | 0.33 | — | — | — | 29.07 | 21.76 |
| Polyol 8 | — | — | — | — | — | — | — | — | — | 2.87 |
| Polyol 9 | 3.2 | 3.15 | 2.89 | 2.63 | 3.0 | 2.84 | 3.15 | 2.91 | 2.18 | 1.78 |
| Polyol 10 | — | — | — | — | 3.17 | — | — | — | — | — |
| N-methyl-2-pyrrolidone | 8.97 | 8.83 | 8.08 | 7.36 | 4.51 | 7.95 | 8.81 | 8.10 | 3.02 | 2.81 |
| Radical trapper | 0.30 | 0.30 | — | — | — | — | — | — | — | — |
| Isophorone diisocyanate | 13.49 | — | 11.02 | 10.04 | 14.67 | 12.6 | — | — | 9.51 | 8.94 |
| Desmodur W (dicyclohexylmethane- | — | 15.8 | — | — | — | — | 15.75 | 14.57 | — | — |

-continued

| | Example | | | | | | | | | |
|---|---|---|---|---|---|---|---|---|---|---|
| | 3 | 4 | 5 | 6 | 7 | 8 | 9 | 10 | 11 | 12 |
| 4,4'-diisocyanate) | | | | | | | | | | |
| N-Methyl morpholine | 2.41 | 2.38 | 2.89 | 2.63 | 2.72 | 3.5 | 2.37 | 2.19 | 1.76 | 2.13 |
| Water, deionized | 52.91 | 51.77 | 56.13 | 51.15 | 52.87 | 55.36 | 53.73 | 49.76 | 54.46 | 59.71 |

| | |
|---|---|
| Polyol 1 | Polycaprolactone diol<br>MW: 2000<br>OHV: 56 |
| Polyol 2 | Polycaprolactone diol<br>MW: 3000<br>OHV: 37 |
| Polyol 3 | Polyester polyol synthesized from adipic acid and diethylene glycol<br>OHV: 60 |
| Polyol 4 | Polyester polyol synthesized from adipic acid, diethylene glycol, 1,6-hexane diol and neopentyl glycol |
| Polyol 5 | Polypropylene glycol<br>OHV: 56 |
| Polyol 6 | Polypropylene glycol<br>OHV: 38 |
| Polyol 7 | Polyether polyol based on a natural glycerol<br>MW: 5500<br>OHV: 30 |
| Polyol 8 | Oleochemical polyol<br>MW: 1000<br>OHV: 160 |
| Polyol 9 | Dimethylol propionic acid |
| Polyol 10 | Oleochemical polyol<br>MW: 750<br>OHV: 220 |

Test for alcohol resistance

The printing inks were knife-coated onto flexible PVC film in a layer thickness of 100 μm and dried for 1 minute at 90° C. After cooling to room temperature, a cotton wool plug impregnated with ethanol/water (60:40 parts by weight) was applied to part of the surface (the cotton wool plug was covered with a watch glass to prevent it from drying out).

The surfaces were then visually evaluated after 10 to 240 minutes.

Visual evaluation:

| | Appearance of the surface after (minutes) | | | | | |
|---|---|---|---|---|---|---|
| Example | 10 | 30 | 60 | 120 | 180 | 240 |
| 3 | 5 | 5 | 4 | 4 | 4 | 3 |
| 4 | 5 | 5 | 4 | 4 | 4 | 4 |
| 5 | 5 | 5 | 4 | 3 | 3 | 2 |
| 6 | 5 | 4 | 4 | 3 | 3 | 2 |
| 7 | 3 | 2 | 1 | | | |
| 8 | 3 | 2 | 1 | | | |
| 10 | 3 | 2 | 1 | | | |
| 11 | 3 | 2 | 1 | | | |
| 12 | 3 | 2 | 1 | | | |

5 Points: no change = very good
4 Points: slight surface attack = good
3 Points: surface affected = adequate
2 Points: serious surface attack = poor
1 Point: total destruction = inadequate

We claim:

1. A coating composition for flexible substrates containing an aqueous polyurethane dispersion, wherein the polyurethane dispersion comprises a polyurethane comprising residues of a block A of a polycaprolactone diol and a block B of a polycaprolactone diol wherein an average molecular weight of the block A is different from an average molecular weight of the block B and each of block A and block B falls within an average molecular weight of from 230 to 10,000 and a hydroxyl value of from 15 to 540 and wherein a ratio of an amount by weight of block A to an amount by weight of block B is from 10:1 to 1:10.

2. A coating composition of claim 1, wherein the polyurethane is synthesized from a mixture comprising a polyol mixture containing predominantly polycaprolactone diols, an isocyanate mixture having an average NCO functionality greater than 1.5 in an NCO:OH ratio of 0.9:1 to 2.5:1 and functional components capable of salt formation in aqueous solution.

3. A coating composition of claim 2, wherein the polyurethane is synthesized from a mixture comprising a polyol mixture containing 60 to 100% by weight polycaprolactone diols and 0 to 40% by weight of at least one member selected from the group consisting of polyether polyol, polytetrahydrofuran and polyester polyol containing an average 2 to 4 OH groups.

4. A coating composition of claim 2, wherein the polyurethane is synthesized from a polyol mixture containing 80 to 100% by weight polycaprolactone diols.

5. A coating composition of claim 2 wherein the polyurethane is synthesized from a mixture comprising two different polycaprolactone diol blocks, wherein the first polycaprolactone diol block A has an average molecular weight of 500 to 2,500 and a hydroxyl value of 40 to 225 and the second polycaprolactone diol block B has an average molecular weight of 2,500 to 6,000 and a hydroxyl value of 15 to 55.

6. A coating composition of claim 1 wherein the polyurethane is synthesized from an isocyanate mixture containing a composition selected from the group consisting of aliphatic and aromatic isocyanates, having an average NCO functionality above 1.5.

7. A coating composition of claim 1 wherein the polyurethane is synthesized from at least one isocyanate selected from the group consisting of branched diisocyanates and cycloaliphatic diisocyanates.

8. A coating composition of claim 1 wherein the polyurethane contains the residue of at least one co-condensed component capable of salt formation in aqueous solution selected from the group consisting of dihydroxycarboxylic acids and dihydroxysulfonic acids.

9. A coating composition of claim 1 wherein the polyurethane contains the residues of isocyanate-reactive diamines as chain-extending agents.

10. A coating composition of claim 1 wherein the polyurethane dispersion has a solid content of 30 to 60% by weight.

11. A coating composition of claim 1 containing the polyurethane dispersion in a quantity of 5 to 80% by weight.

12. A coating composition of claim 1 which contains water in an amount of 2 to 80% by weight, a water-miscible organic solvent in an amount of 0 to 50% by weight and typical additive in an amount of 0 to 80% by weight.

13. A coating composition of claim 9 wherein the polyurethane contains no chain-extending agent.

14. A coating composition of claim 4 wherein the polyol mixture consists essentially of 100% polycaprolactone diols.

15. A coating composition of claim 6 wherein the average NCO functionality is from 2 to 3.

16. A coating composition of claim 10 wherein the polyurethane dispersion has a solids content of from 35% to 55% by weight.

17. A coating composition of claim 11 containing from 20 to 75% by weight of the polyurethane dispersion.

18. A coating composition of claim 17 containing from 50% to 70% by weight of the polyurethane dispersion.

* * * * *